United States Patent
Hebbar et al.

(10) Patent No.: US 8,874,067 B2
(45) Date of Patent: Oct. 28, 2014

(54) MEDICAL DATA ACCESS SYSTEM

(75) Inventors: Abdelkrim Hebbar, Nozay (FR); Abderrahmane Maaradji, Massy (FR)

(73) Assignee: Alcatel Lucent, Boulogne-Billancourt (FR)

( * ) Notice: Subject to any disclaimer, the term of this patent is extended or adjusted under 35 U.S.C. 154(b) by 230 days.

(21) Appl. No.: 13/379,414

(22) PCT Filed: May 12, 2010

(86) PCT No.: PCT/EP2010/056598
§ 371 (c)(1),
(2), (4) Date: Feb. 9, 2012

(87) PCT Pub. No.: WO2010/149428
PCT Pub. Date: Dec. 29, 2010

(65) Prior Publication Data
US 2012/0129485 A1   May 24, 2012

(30) Foreign Application Priority Data
Jun. 24, 2009 (FR) .................................... 09 03061

(51) Int. Cl.
*H04W 4/22* (2009.01)
*H04L 9/08* (2006.01)

(52) U.S. Cl.
CPC .............. *H04L 9/083* (2013.01); *H04L 9/0866* (2013.01); *H04L 2209/80* (2013.01)
USPC .................................... 455/404.1; 455/404.2

(58) Field of Classification Search
USPC .................... 455/403, 404.1, 404.2, 517, 521
See application file for complete search history.

(56) References Cited

U.S. PATENT DOCUMENTS

| 7,733,224 | B2 * | 6/2010 | Tran ............................... 340/540 |
| 8,600,776 | B2 * | 12/2013 | Raduchel ........................ 705/3 |
| 2002/0083192 | A1 * | 6/2002 | Alisuag ........................ 709/237 |
| 2003/0091159 | A1 * | 5/2003 | Oxley ............................. 379/38 |
| 2005/0053209 | A1 * | 3/2005 | D'Evelyn et al. ............. 379/111 |
| 2006/0252998 | A1 * | 11/2006 | Kimbrell ....................... 600/300 |
| 2007/0078784 | A1 * | 4/2007 | Donovan et al. ............... 705/71 |
| 2007/0125844 | A1 * | 6/2007 | Libin et al. .................... 235/380 |
| 2008/0028214 | A1 * | 1/2008 | Tafoya et al. ................. 713/166 |
| 2008/0046464 | A1 * | 2/2008 | Gustavsson ............... 707/104.1 |
| 2008/0177569 | A1 * | 7/2008 | Chen et al. ....................... 705/2 |

FOREIGN PATENT DOCUMENTS

| EP | 1322086 | 6/2003 |
| WO | 2007120548 | 10/2007 |

OTHER PUBLICATIONS

Menezes, Vanstone, Oorschot; Handbook of Applied Cryptography; 1997; CRC Press LLC; USA; XP000863995.

* cited by examiner

*Primary Examiner* — Cong Tran
(74) *Attorney, Agent, or Firm* — Carmen Patti Law Group, LLC

(57) ABSTRACT

In order to access a user's medical data (DonM) saved within a mobile terminal (TM) of the user which has transmitted an emergency call to a call center (CA) over a telecommunications network (RT), the mobile terminal transmits an identifier (IdU) of the user to the call center, which assigns an authorized person to the user and transmits an identifier (IdP) of the authorized person and the users identifier (IdU) to a communication server (SC). The server generates a key (Ku) based on the authorized person's identifier and on the users identifier and transmits the key to the mobile terminal (TM) and to a terminal (TC) of the authorized person, in order to unlock access to the medical data (DonM) by way of the key (Ku).

12 Claims, 2 Drawing Sheets

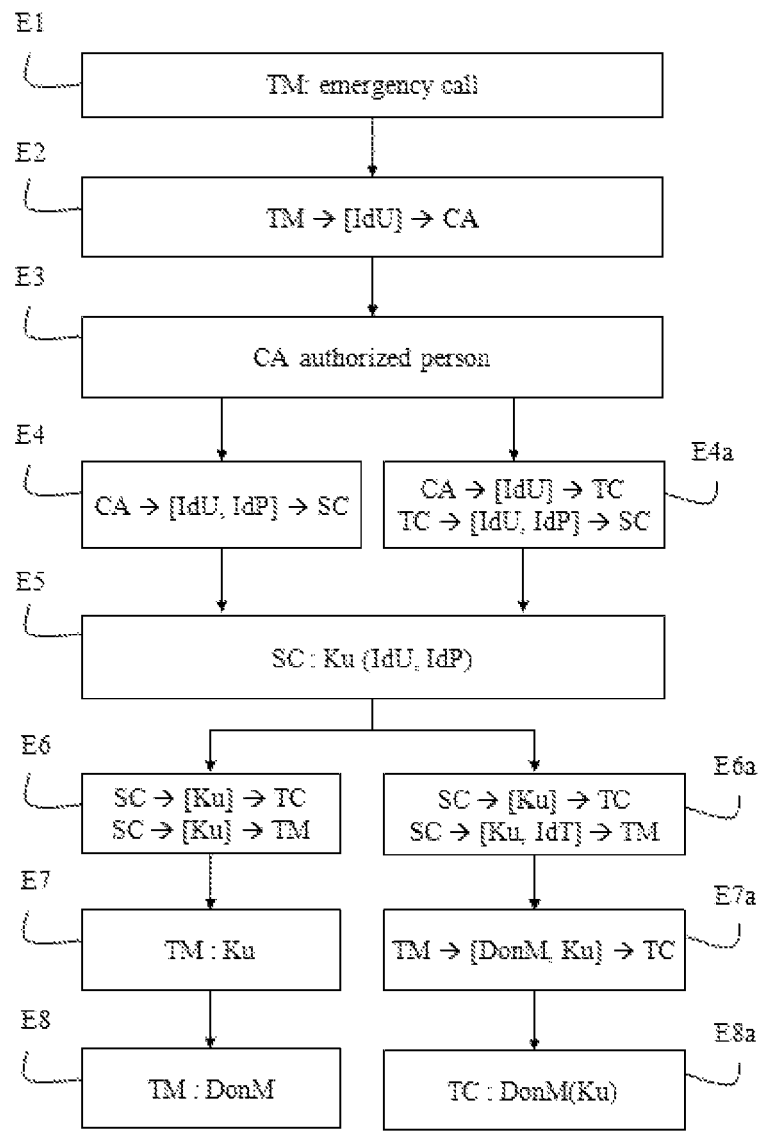

MEDICAL DATA ACCESS SYSTEM

TECHNICAL FIELD

The present invention pertains to a medical data access system.

BACKGROUND

Currently, medical records are available in paper or digital format. These files are very useful in the event of an emergency, such as a road or home accident, when the emergency medical personnel must be informed about the medical background of a person who has fallen victim to an accident.

There are smart cards that contain, in encrypted form, medical records and contact information for a doctor who is caring for the person who possesses the smartcard. However, this type of solution is completely useless if the person is no longer capable of giving out his or her smartcard or indicating where the card may be found. Furthermore, the medical personnel must be equipped with a reader suitable for that sort of smart card.

There are also solutions based on which a person may directly send his or her medical record or a URL ("Uniform Resource Locator") address to a medical team, allowing access to the medical record with the help of a certificate. Likewise, this type of solution is completely useless if the person, having lost consciousness, cannot perform the operations that are required of him or her, and additionally poses risks related to medical records confidentiality.

There is a need to provide a person's medical record to authorized medical personnel, regardless of his or her condition and ability to communicate.

SUMMARY

One goal of the invention is to remedy the aforementioned drawbacks by proposing a medical data access system capable of providing medical data related to a person, in any sort of situation, while preserving the person's medical privacy.

To achieve this goal, a method for accessing a users medical data saved within a mobile terminal of the user which has transmitted an emergency call to a call center over a telecommunications network, comprises the following steps within a communication server:

after transmitting an identifier of the user from the mobile terminal to the call center, assigning an authorized person to the user within the call center, and transmitting an identifier of the authorized person and the users identifier from the call center to the communication server, generating a key based on the authorized person's identifier and the user's identifier within the communication server, transmitting the key to the mobile terminal and to a terminal of the authorized person from the communication server, in order to unlock access to the medical data by means of the key.

Advantageously, the user still has control of his or her medical data, which can no longer be accessed after the medical team's intervention. The medical data may be accessed only by an authorized entity: the user or the authorized person, who may be a member of a medical team. No message may be intercepted by a third-party entity, except for the medical team.

According to other characteristics of the invention, the authorized person may enter the key into the mobile terminal, which verifies that the entered key received from the communication server, or the authorized person's terminal, can transmit the received key from the communication server to the mobile terminal via a short-range wireless connection, which verifies that the key received from the authorized person's terminal matches the key received from the communication server.

According to another characteristic of the invention, the communication server may further transmit an identifier of the authorized person's terminal to the mobile terminal, the mobile terminal may transmit the medical data and the key received from the communication server to the terminal of the authorized person, who verifies that the key received from the mobile terminal matches the key received from the communication server.

According to another characteristic of the invention, the call center may transmit the user's identifier to a terminal of the authorized person, and the authorized person's terminal may transmit an identifier of the authorized person and the users identifier to the call center, which retransmits the identifiers to the communication server.

The invention also pertains to a terminal for accessing a users medical data saved within a mobile terminal of the user which has sent an emergency call to a call center over a telecommunications network, characterized in that it comprises:

means for transmitting an identifier of the user to the call center, which assigns an authorized person to the user and transmits an identifier of the authorized person and the users identifier to a communication server, which generates a key based on the authorized person's identifier and the user's identifier and transmits the key to a terminal of the authorized person and to the mobile terminal, means for receiving the key transmitted by the communication server, and means for unlocking access to the medical data by way of the key.

The invention also pertains to a call center for accessing a user's medical data saved within a mobile terminal of the user which has sent an emergency call to a call center over a telecommunications network, characterized in that it comprises:

means for assigning an authorized person to the user, after having received an identifier of the user transmitted by the mobile terminal, and means for transmitting an identifier of the authorized person and the users identifier to a communication server that generates a key based on the authorized person's identifier and the user's identifier and transmits the key to the mobile terminal and to a terminal of the authorized person, in order to unlock access to the medical data by way of the key.

The invention also pertains to a communication server for accessing a user's medical data saved within a mobile terminal of the user which has sent an emergency call to a call center over a telecommunications network, characterized in that it comprises:

means for generating a key based on an authorized person's identifier and on the user's identifier transmitted from the call center, which has assigned an authorized person to the user after having received an identifier of the user transmitted from the mobile terminal, and means for transmitting the key to the mobile terminal and to a terminal of the authorized person, in order to unlock access to the medical data by way of the key.

DESCRIPTION OF THE DRAWINGS

The present invention and the benefits thereof shall be better understood upon examining the description below, which makes reference to the attached figures, in which:

FIG. 2 is an algorithm of a medical data access method according to one embodiment of the invention.

DETAILED DESCRIPTION

Figure 1:
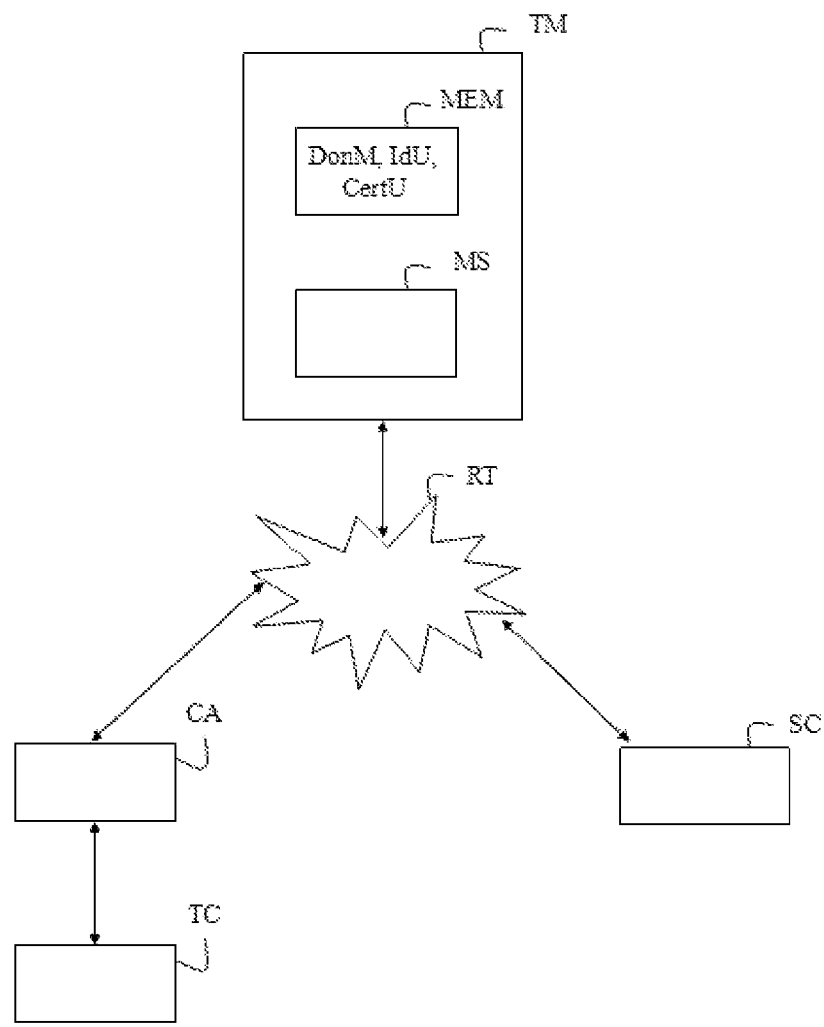
FIG. 1 is a schematic block diagram of a medical data access system according to one embodiment of the invention.

With reference to FIG. 1, a medical data access system comprises a mobile terminal TM, a call center CA, a communication server SC, capable of communicating with one another over a telecommunications network RT.

The telecommunications network RT may comprise a wireless network, such as a digital cellular radio communication network of the GSM ("Global System for Mobile communications") or UMTS ("Universal Mobile Telecommunications System") type. The telecommunications network RT may be connected to a packet network of the IMS ("IP Multimedia Subsystem" type). Furthermore, the telecommunications network RT may comprise a wired network or be a combination of wired and wireless networks.

According to one example, a mobile terminal TM is a mobile cellular radio communications terminal, connected by a radio communication channel to an access network comprising the fixed network of a radio communication network, for example of the GSM or UMTS type.

According to another example, a mobile terminal TM comprises a device or electronic telecommunications object which is personal to the user and which may be a communicating personal digital assistant, or PDA, or a smartphone, which may be connected to an access terminal of a short-range wireless public network of the WLAN ("Wireless Local Area Network") type or one compliant with one of the 802.1x standards, or a medium-range wireless public network according to the WIMAX ("World wide Interoperability Microwave Access") protocol.

Optionally, the mobile terminal TM is capable of communicating via a short-range wireless connection of the WiFi or Bluetooth type.

The mobile terminal TM contains within a memory MEM medical data DonM related to the user and a user identifier IdU, and optionally a user certificate. Since the medical data related to the user is saved within the mobile terminal, the user identifier IdU may be an identifier specific to the mobile terminal. It is assumed that the medical data related to the user contains information about the users health and medical history, which are necessary and sufficient for medical teams to provide care to the user. The medical data is saved in encrypted format, and may only be decrypted after access to them is unlocked by way of a unique key Ku delivered by the communication server SC. The medical data may be a copy of part of the users medical records.

The mobile terminal TM contains a security module MS which is capable of detecting any emergency call and automatically transmitting information to the call center. In particular, the security module MS may encrypt the user identifier IdU by means of the certificate CertU and transmit the encrypted identifier to the call center. Furthermore, the security module MS unlocks access to medical data DonM and may only unlock that access by means of a unique key delivered by the communication server SC.

The call center CA is, for example, a PABX ("Private Automatic Branch eXchanger") exchange of appropriate size for substantial, specific traffic. The call center CA may be an emergency or rescue call center that may be called by dialing 911 in the United States and Canada, or 112 in Europe.

The call center CA is connected to work capable of communicating with a communication terminals TC of one or more medical teams associated with the call center and comprising people, such as doctors, who are authorized to access users' medical data.

The communication server SC is, for example, managed by a telecommunications operator, a government authority, or by a health organization. More generally speaking, the communication server meeting managed by a trusted third party who designates beforehand the people authorized to access users' medical data. For example, a single person from a medical team is authorized by the trusted third-party to access the medical data of the user who possesses the mobile terminal. For that purpose, the communication server delivers a unique key Ku to said authorized person.

With reference to FIG. 2, a method for accessing medical data related to a user according to one embodiment of the invention comprises steps E1 to E8.

Initially, the mobile terminal's user is, for example, the victim of an accident, for which it is necessary to alert a medical team. It is assumed that a person who witnessed the accident comes to the users aid.

In step E1, said witness takes possession of the users mobile terminal TM and dials an emergency call number, such as 112, in order to establish communication with a call center, i.e. the call center CA automatically detected based on the mobile terminal's TM location.

In step E2, the security module MS transmits the user identifier IdU saved within the mobile terminal TM to the call center CA. Optionally, the user identifier IdU had previously been encrypted via a user certificate. The call center CA thereby receives both a voice call and data comprising the identifier IdU.

In step E3, the call center CA assigns an authorized person to the user and searches for a profile of the authorized person, after having decrypted the identifier, if need be, using a public key corresponding to the user certificate if that certificate had been encrypted. The authorized person may be part of the medical team that is ready to help the user who fell victim to the accident. Said profile particularly contains different information about ways of communicating with the authorized person, such as telephone numbers or e-mail addresses. The authorized person may have multiple communication terminals, such as a personal computer or landline telephone when the authorized person is at his or her workplace, and a mobile terminal when the authorized person is traveling or also at his or her workplace.

In step E4, after having assigned an authorized person to the user in order to access the user's medical data, the call center CA transmits the user identifier IdU and an identifier IdP of the authorized person to the communication server SC. Optionally, the identifier IdP had previously been encrypted with the authorized person's certificate.

In one variant, during a step E4a replacing the step E4, the call center CA transmits the user identifier IdU to the authorized person, such as by way of a message transmitted to a communication terminal TC of the authorized person. The authorized person then transmits the user identifier IdU and an identifier IdP of the authorized person from the communication terminal TC to the communication server SC, by the call center CA.

Optionally, the call center CA or the person who received the emergency call transmits information related to the user obtained during the call to the authorized person.

In step E5, the communication server SC generates a unique key Ku based on the identifiers IdU and IdP, potentially after having decrypted them if they had been encrypted. The key Ku is, for example, a uniquely generated password.

In step E6, the communication server SC transmits the unique key Ku to the mobile terminal TM and to a communication terminal TC of the authorized person. For example, the communication terminal TC is a mobile terminal, as the authorized person may already be traveling to where the user is located.

In step E7, when the authorized person arrives at the user, the authorized person enters the key Ku, for example via interface launched automatically by the security module MS after the emergency call is established. The security module MS verifies that the key entered by the authorized person matches the key received from the communication server SC.

In one variant, the authorized person transmits the key Ku from his or her communication terminal TC to the mobile terminal TM via a short-range wireless connection.

In step E8, if the key Ku entered by the authorized person matches the key received by the mobile terminal, the security module MS unlocks access to the medical data DonM, which then becomes decrypted and accessible. The authorized person may therefore read the medical data related to the user.

In one variant, in a step E6a that follows the step E5, the communication server SC transmits the unique key Ku and an identifier IdT of a communication terminal TC of the authorized person to the mobile terminal TM and transmits the unique key Ku to the communication terminal TC of the authorized person.

In a step E7a, following the receipt of the unique key Ku and of a communication terminal's TC identifier, the security module MS transmits the medical data DonM and the unique key Ku to the communication terminal Tc.

In a step E8a, after having verified that the key Ku received from the mobile terminal TM matches the key received from the communication server SC, an application within the communication terminal TC decrypts the medical data DonM, which becomes accessible. The authorized person may therefore read the medical data related to the user.

The authorized person may thereby examine the users medical records before reaching the user, which improves the effectiveness of the medical team's intervention.

The invention claimed is:

1. A method for accessing medical data of a user saved within a mobile terminal of the user which had transmitted an emergency call that identifies the user to a call center, comprising:
    receiving, at a communication server from the call center, an identifier of the user and an identifier of an authorized person associated with the call center who has been assigned to the user;
    generating, at the communication server, a key based on the identifier of the user and the identifier of the authorized person; and
    transmitting, at the communication server, the key to the mobile terminal and to a terminal of the authorized person, wherein the key enables the authorized person to obtain access to the medical data.

2. The method according to claim 1, wherein at least one of the identifier of the authorized person and the identifier of the user is encrypted.

3. The method according to claim 1, further comprising receiving, at the communication server, retransmitted identifiers of the user and the authorized person from the call center.

4. A mobile terminal configured to store information within the mobile terminal and to transmit an emergency call to a call center, comprising:
    a memory component configured to store medical data of a user of the mobile terminal and an identifier of the user, wherein the identifier is specific to the mobile terminal; and
    a security component configured to detect the emergency call, transmit the identifier to the call center, and provide access to the medical data by means of a key that is based on the identifier of the user and an identifier of an authorized person associated with the call center who has been assigned to the user.

5. The mobile terminal according to claim 4, wherein the medical data comprises health and medical history of the user.

6. A call center for accessing medical data of a user saved within a mobile terminal of the user that had transmitted an emergency call that identifies the user to the call center, comprising:
    means for assigning an authorized person associated with the call center to the user after receipt of an identifier of the user transmitted by the mobile terminal; and
    means for transmitting an identifier of the authorized person and the identifier of the user to a communication server, wherein the communication server generates a key based on the identifier of the authorized person associated with the call center and the identifier of the user and transmits the key to the mobile terminal and to a terminal of the authorized person to enable the authorized person to obtain access to the medical data of the user.

7. A communication server for accessing a user's medical data saved within a mobile terminal of the user that had transmitted an emergency call to a call center, comprising:
    means for generating a key based on an identifier of an authorized person associated with the call center and an identifier of the user received from the call center; and
    means for transmitting the key to the mobile terminal and to a terminal of the authorized person, wherein the key enables the authorized person to obtain access to the user's medical data.

8. A method of accessing medical data of a user saved within a mobile terminal of the user, comprising:
    transmitting, at the mobile terminal, an identifier of the user in an emergency call to a call center;
    receiving, at the mobile terminal, a first key transmitted by a communication server, wherein the first key is based on the identifier of the user and an identifier of an authorized person associated with the call center who has been assigned to the user; and
    providing, at the mobile terminal, access to the medical data when a second key entered by the authorized person matches the first key received from the communication server.

9. The method according to claim 8, wherein the authorized person enters the second key into the mobile terminal to verify that the entered second key matches the first key received from the communication server.

10. The method according to claim 8, further comprising:
    receiving, at the mobile terminal, the second key from the terminal of the authorized person via a short-range wireless connection; and
    determining, at the mobile terminal, that the second key matches the first key received from the communication server.

11. The method according to claim 8, further comprising:
    receiving, at the mobile terminal, an identifier of the authorized person's communication terminal from the communication server; and transmitting, at the mobile terminal, the medical data and the first key received from the communication server to the terminal of the authorized person to authenticate the first key.

12. A method for a call center to obtain access to medical data of a user saved within a mobile terminal of the user, comprising:
  receiving, at the call center, an emergency call from the mobile terminal that contains an identifier of the user;
  assigning, at the call center, an authorized person associated with the call center to the user; and
  transmitting, at the call center, an identifier of the authorized person associated with the call center and the identifier of the user to a communication server to generate a key based on the identifier of the authorized person and the identifier of the user to enable the authorized person to obtain access to the medical data.

\* \* \* \* \*